United States Patent [19]

McClellan

[11] Patent Number: 5,078,370
[45] Date of Patent: Jan. 7, 1992

[54] UPPER MOUNT FOR SUSPENSION STRUT

[75] Inventor: Michael A. McClellan, Fraser, Mich.

[73] Assignee: Chrysler Corporation, Highland Park, Mich.

[21] Appl. No.: 618,335

[22] Filed: Nov. 23, 1990

[51] Int. Cl.⁵ .............................................. F16F 9/54
[52] U.S. Cl. .................................... 267/220; 280/668
[58] Field of Search ..................... 267/33, 220, 225; 188/321.11; 288/668

[56] References Cited

U.S. PATENT DOCUMENTS

| | | | |
|---|---|---|---|
| 4,465,296 | 8/1984 | Shiratori et al. | 267/220 X |
| 4,805,886 | 2/1989 | Hassan | 267/220 |
| 4,934,730 | 6/1990 | Okuzumi | 280/668 |

FOREIGN PATENT DOCUMENTS 8905242 6/1989 World Int. Prop. O. .......... 267/220

Primary Examiner—George E. A. Halvosa
Attorney, Agent, or Firm—Edward P. Barthel

[57] ABSTRACT

An automotive front suspension strut upper mounting arrangement providing a compact low profile design requiring a minimal number of parts. The suspension spring rebound load is placed on a lower rebound stop member of the mount and the suspension jounce load is placed on an upper jounce stop member of the mount. As a result the upper jounce stop member provides an installation pilot for ready assembly while the lower rebound member is fixed to the vehicle body allowing the strut rod freedom to move relative to the strut thrust bearing.

3 Claims, 1 Drawing Sheet

UPPER MOUNT FOR SUSPENSION STRUT

BACKGROUND OF THE INVENTION

This invention relates to automotive suspensions and, more particularly, to an improved hydraulic shock absorbing suspension strut upper mount providing a low profile together with ease of assembly line installation.

An example of one low profile suspension strut is found in U.S. Pat. No. 4,747,587 issued May 31, 1988 to Farrell and assigned to the assignee of the present application. The Farrell patent discloses a strut isolator and jounce bumper upper mount providing a compact resilient assembly adaptable for a vehicle having a reduced hood line.

The U.S. Pat. No. 4,934,730 issued June 19, 1990 to Okuzumi is an example of a vehicle front suspension strut wherein the upper end of the strut piston rod is engaged in an inner sleeve of a mount insulator for limited axial movement relative to the inner sleeve.

SUMMARY OF THE INVENTION

It is an object of the present invention to provide an improved upper mount for a vehicle suspension strut wherein assembly is simplified.

It is another object of the present invention to provide an improved upper mount for a vehicle suspension strut having a compact low profile for use with a vehicle having a reduced hood line.

In accordance with the present invention, there is provided a strut damper upper mount for a suspension strut wherein the spring rebound stop load is placed on a lower surface of the mount while the jounce stop load is placed as an upper surface of the mount. This arrangement provides freedom of mount design since a relatively few parts are required to assembly the spring to the strut rod for retainment by a single nut. The invention permits a hat-shaped upper mounting plate be used as both a jounce stop and as an installation pilot. Further, the invention provides a low profile mount since it allows an inner annular cup structure to be axially extended permitting the strut to travel within the mount during full suspension jounce.

These and other objects and advantages of the present invention will be readily apparent by reference to the following description of the preferred embodiment and the accompanying drawing which shows, mostly in cross section, a vehicle suspension strut incorporating the improved upper mount.

DETAILED DESCRIPTION OF THE INVENTION

Figure 1:
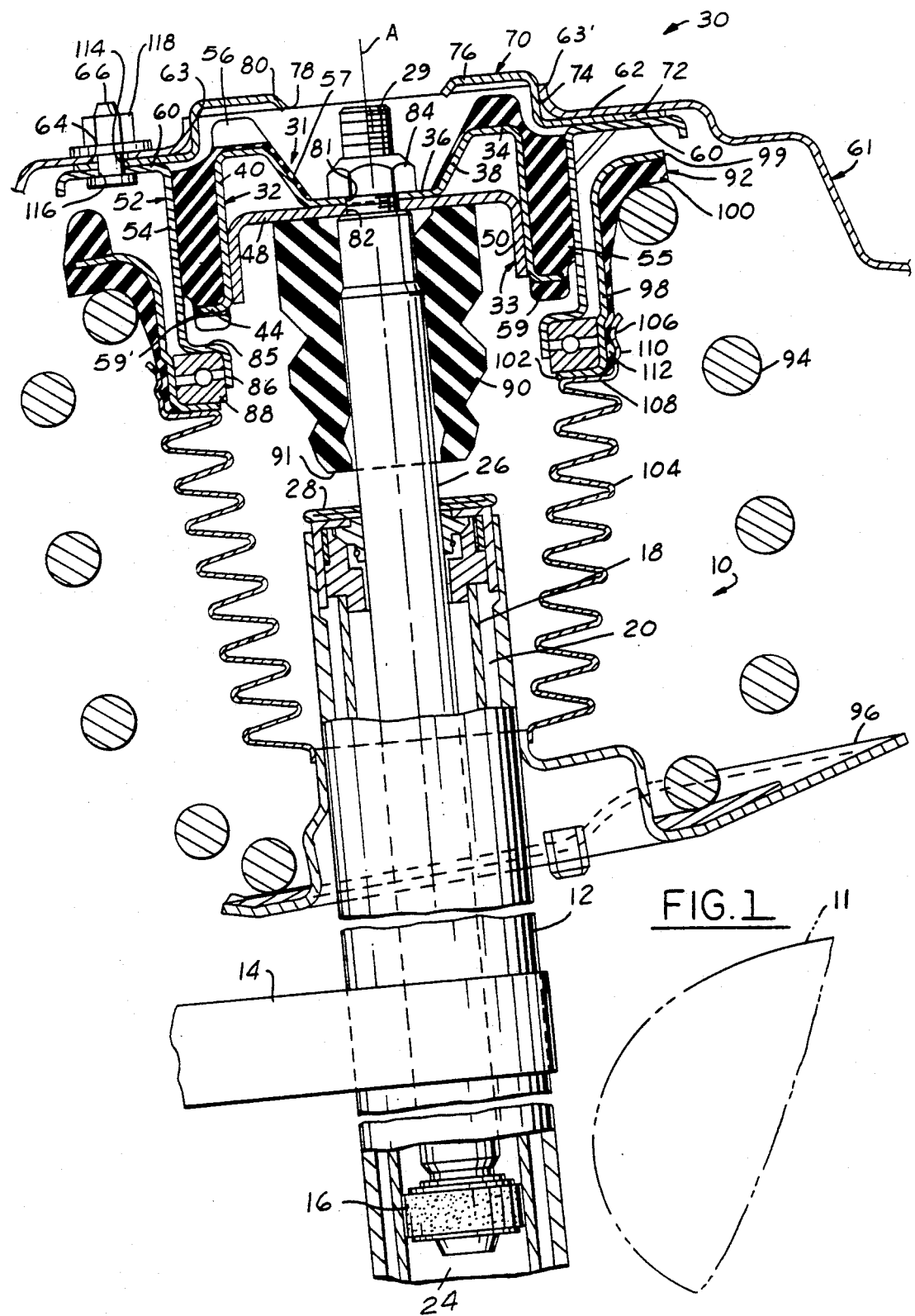

Referring now to the drawing, there is shown a portion of a vehicle front suspension of a vehicle wheel incorporating a shock absorbing suspension strut 10 interconnecting the vehicle sprung mass or body portion and a vehicle unsprung mass supported by a front wheel 11. The strut 10 comprises an outer reservoir support casing 12 supported at its lower end in a mounting bracket partially indicated at 14. The mounting bracket 14 is attached to a steering knuckle (not shown) of a steerable front road wheel assembly driven by a rotatable axle (not shown).

Secured within the reservoir support casing 12 is a hydraulic shock absorbing cartridge having a valved piston 16 mounted for reciprocating sliding movement in cylinder tube 18 radially spaced inwardly form the support casing 12 to provide a reservoir 20 for the hydraulic dampening fluid of the strut. A base valve (not shown) provides controlled hydraulic communication between the reservoir 20 and the variable volume compression chamber 24 formed by the reciprocating piston 16 and the cylinder tube 18. The piston 16 is connected to the lower end of a cylindrical piston rod 26 which extends axially and upwardly through an end cap 28 fastened to the upper end of the support casing 12. The piston rod 26 has a reduced diameter threaded upper end 29 removable attached to a strut upper mounting assembly, generally indicated at 30, which is the subject of the present invention.

The upper mount assembly 30 comprises an inverted inner annular cup structure 31 concentrically disposed about the strut principal axis "A". The inverted cup structure 31 comprises an outer inverted cup 32 and an inner inverted cup 33 nested within the downwardly facing open end of the outer cup. The outer cup 32 has a closed upper end wall including an outer annular peripheral jounce and wall portion 34 formed with a central depression or recess disposed concentrically about the strut principal axis "A". The central recess has a concentric center disc portion 36 joined to the peripheral jounce and wall portion 34 by an inwardly and downwardly extending frusto-conical shaped slope portion 38. The inverted outer cup 32 has a cylindrical wall portion 40 terminating at its lower open end with a radially outwardly extending annular spring rebound traveling flange 44.

The inner cup 33 has a planar base portion 48 and a cylindrical side wall portion 50 having an axial extent about one-half the axial extent of the outer side wall portion 40. The inner cup base portion 48 is located in flush abutting contact with opposed recessed center disc base portion 36 and fixedly secured thereto as by welding. In a like manner, the opposed mating surfaces of the outer and inner cup side walls 40 and 50, respectively, are fixedly secured as by welding.

An outer collar member, generally indicated at 52, includes a cylindrical collar portion 54 surrounding the cup structure outer cup side wall portion 40 in a spaced concentric manner defining an annular space therebetween. A resilient cylindrical shaped isolator 55, molded of suitable deformable or elastomeric material such as natural or synthetic rubber, is fitted in the annular space. The isolator 55 is bonded, as by vulcanization or other known bonding means, to the cup side wall portion 40 outer surface. The isolator 55 may be retained to the collar portion 54 concentric inner surface either by gluing or by means of an interference press fit.

It will be noted that the isolator 55 has its upper end molded integral with an upper annular secondary jounce stop bumper means secured to the peripheral jounce end wall portion 34 of the outer cup 32. In the preferred embodiment, the jounce bumper portion is formed of the same elastomeric material as the isolator 55 and comprises a plurality of raised lugs 56 circumferentially spaced in a uniform manner around the jounce end wall portion 34. It will be seen from the drawing that the jounce bumper lugs 56 are formed integral with an overlying skin or thin film portion 57 extending integrally from the isolator 55 with the film portion 57 bonded to and conforming with the upper surface of the cup end wall portions 34 and 38.

In a similar manner, the isolator 55 has its lower end molded integral with lower annular rebound bumper means secured to the undersurface of the annular rebound traveling flange 44. Thus, in the preferred embodiment, the rebound bumper means comprises a plurality of raised lugs 59 circumferentially spaced in a uniform manner around the rebound stop flange 44. The rebound bumper lugs 59 are formed integral with an overlying skin or thin film portion 59' extending integrally from the isolator 55 and bonded to and conforming with the lower surface of the rebound traveling flange 44.

The collar member 52 has an integral radially outwardly extending attaching flange portion 60 formed at its upper end. The collar attaching flange portion 60 is removable fixed to a sheet-like panel such as a metal cylindrical strut mounting tower 61 of the sprung part of the vehicle. The mounting tower 61 is formed with a stepped top panel 62 which, in the preferred embodiment, has an opening 63 defined by a cylindrical upstanding portion 63'. A plurality of bolt openings, one of which is shown at 64, concentrically surrounding the opening 63 and are adapted to receive threaded bolts 66 therethrough in a manner to be explained.

The upper mount assembly 30 includes an upper generally hat-shaped mounting plate 70 comprising a radially outwardly extending rim 72 and a central annular raised lead-in or pilot boss. The pilot boss is defined by an axially extending annular neck portion 74 terminating in a radially inwardly extending annular jounce stop ring 76. The jounce stop ring 76 is formed with a central access opening 78, defined by downwardly angled ring bevel portion 80, with the center of the opening 78 aligned on the strut axis "A". It will be noted that the cup structure disc portion 36 and base portion 48 have aligned holes 81 and 82, respectively, sized for the reception of the piston rod threaded end 29 therethrough. The access opening 78 allows nut 84 to be applied and tightened on the piston rod threaded end 29 upon its insertion through the aligned holes 81 and 82.

The collar member 52 is formed at its lower end with an L-shaped annular flange providing a radially inwardly extending rebound stop shelf flange portion 85 and an axially depending riser flange portion 86. The L-shaped annular flange provides an annular externally facing notch sized to receive therein a circular ball bearing ring 88.

A standard elastomeric primary jounce bumper 90 surrounds the top part of the piston rod 26 at a location between the upper end cap 28 of the strut outer support casing 12 and the cup base portion 48 of the upper mount 30. The primary jounce bumper lower end 91 is adapted to engage the strut casing upper end cap 28 to cushion and limit inward telescoping of the piston rod 26 relative to the casing 12. An upper annular spring seat assembly 92 is supported by the upper end coil of a helical suspension ring 94. The suspension spring 94 spirals around the strut outer support casing 12 and extends upwardly from an annular lower spring support member 96 welded or otherwise secured to the support casing 12 just above the mounting bracket 14.

The upper spring seat assembly 92 comprises a sheet metal tubular member 98 concentrically surrounding in a radially spaced manner the lower portion of the cup structure collar portion 54. The tubular member 98 is formed with an outwardly direction radial upper spring flange 99. The tubular member 98 and the spring flange 99 are provided with an annular spring seat rubber layer 100 bonded to the undersurface of flange 99 and outer surface of the tubular member 98 to resiliently seat the suspension spring 94 upper end coil. The tubular member 98 is shown formed with an inwardly directed radial lower bearing flang seat 102 adapted to be positioned in concentric relation axially below the stop flange portion 85 so as to capture the bearing ring 88 in cooperation with the collar member L-shaped flange portion 86.

A dust tube 104, made of suitable elastomeric or plastic material, has its upper end formed with a right angle band having a cylindrical band portion 106 and a radial band portion 108. The band portion 106 is formed with an annular detent groove 110 which slip fits onto a resilient annular connector rib 112 of spring seat the rubber portion 100. The jounce bumper 90 lower end is adapted to engage the end cap 28 to cushion and limit inward telescoping of the piston rod 26 relative to the casing 12.

Applicant's improved upper mount design places the spring rebound load on the mount lower rebound stop flange bumper 59 and the suspension jounce load on the mount upper jounce bumper 56. As a result, only the upper mount 30 is required to be attached to the vehicle body tower panel 59 by the bolts 66 prior to the assembly of the strut 10 and spring 94 by inserting the piston rod threaded end 29 through the aligned apertures 80 and 82 and for retention by torquing the nut 84.

The upper mount 30 is assembled with the plate 70 having its rim 72 overlying the collar attaching flange 60 such that the plurality of rim holes 114 are aligned with their associated attaching flange holes 116 for reception of bolts 66 therethrough. It will be noted that the bolts 66 have staking means temporarily locking the plate 70 in a predetermined manner on the attaching flange 60. The mount 30 is thus readily secured to the panel 62 upon the plate raised boss being telescopically received in the opening 63 and the bolts 66 having the ends thereof inserted in associated panel holes 64 and nuts 118 threaded thereon.

While only one embodiment of the present invention has been described, other embodiments and modifications are possible without departing from the scope of the appended claims.

What is claimed is:

1. A vehicle telescoping shock absorbing suspension strut operatively connected between sprung and unsprung masses of a vehicle about the vertically disposed principal axis thereof, said strut having an outer support casing operatively connected to said vehicle unsprung mass and an inner cylindrical tube fixed in said support casing having a hydraulic dampening fluid therein, a valved piston mounted for sliding reciprocal movement in said inner cylinder tube along the principal axis thereof, a piston rod operatively connected to said piston with its upper end extending through one upper end of said cylinder tube and said support casing, a helical suspension spring having a lower end mounted to the support casing and extending upwardly therearound, an upper mounting assembly for said strut piston rod adapted for attachment to a portion of said sprung mass having a circular opening therethrough, said upper mounting assembly comprising:

an inverted inner annular cup structure concentrically disposed about said strut principal axis, said cup structure having an upper closed end formed with a radially inner central depressed portion and a radially outer peripheral upper jounce traveling portion, said cup structure central depressed portion having a central hole therein aligned on said strut principal axis and adapted to receive therethrough said piston rod upper end thereof for attachment thereto, said cup structure comprising a cylindrical wall portion having the lower open end thereof formed with a radially outwardly extending annular lower rebound traveling flange;

an outer collar member positioned outside of and concentrically with said inner cup structure wall portion defining an annular space therebetween, said collar member having a radially outwardly extending annular body mounting flange formed at an upper end thereof and annular spring rebound stop flange means formed at a lower end thereof;

an upper spring seat assembly concentrically surrounding said outer collar member comprising an upper spring flange receiving an upper end of said suspension spring, said upper spring seat assembly having a lower bearing flange operative with said annular spring rebound stop flange means to capture a circular ball bearing ring therebetween;

a mounting plate member being generally hat-shaped defining a central annular raised boss portion and an integral radially outwardly extending rim portion having upper and lower surfaces, said boss portion comprising an axially extending neck portion terminating in a radially inwardly extending annular jounce stop flange portion concentrically disposed about said strut axis and formed with a central strut access opening therein;

said boss portion having a predetermined diameter adapted for telescopic reception in said circular opening, means attaching said rim portion lower surface in flush contact with an upper surface of said collar member body mounting flange such that said mounting plate boss portion has its center aligned on said strut principal axis enabling said boss portion to pilot said mounting assembly in said circular opening;

a right cylindrical-shaped elastomeric isolator fitted in said annular space and bonded to an exterior surface of said inner cup wall portion, said rebound traveling flange having an undersurface thereof provided with elastomeric rebound bumper means secured thereto so as to contact said lower rebound stop flange means upon said strut piston achieving its full downward stroke, and said upper jounce traveling portion having an upper face thereof provided with elastomeric jounce bumper means secured thereto so as to contact said mounting plate member jounce stop flange portion upon said strut piston achieving its full upward stroke.

2. The upper mounting assembly as set forth in claim 1, wherein said annular rebound stop flange means comprises an L-shaped flange defining a radially inwardly extending rebound stop shelf portion and an axially depending riser portion defining an annular notch sized to snugly receive therein in a nested manner said circular ball bearing ring.

3. The upper mounting assembly as set forth in claim 1, wherein said inverted inner annular cup structure comprises an outer inverted cup and an inner inverted cup each having a downwardly facing open end, said inner cup nested within said outer cup downwardly facing open end, said outer cup having a closed upper end wall including an outer annular peripheral jounce end wall portion formed with a central depression, said central depression having a concentric central disc portion joined to said peripheral jounce end wall portion by an inwardly and downwardly extending frusto-conical shaped slope portion;

said inverted outer cup having a cylindrical wall portion terminating at said lower open end with a radially outwardly extending annular spring rebound traveling flange.

* * * * *